United States Patent [19]
Gaillochet

[11] 3,837,451
[45] Sept. 24, 1974

[54] TORQUE-LIMITING CLUTCH
[75] Inventor: Jean R. Gaillochet, Neuilly, France
[73] Assignee: MARINONI, Paris, France
[22] Filed: Dec. 27, 1972
[21] Appl. No.: 318,723

[30] Foreign Application Priority Data
  Feb. 7, 1972 France .................. 72.4024

[52] U.S. Cl. .......... 192/56 R, 192/84 PM, 192/89 B
[51] Int. Cl. ............................................. F16d 7/02
[58] Field of Search ............ 192/56 R, 84 PM, 89 B

[56] References Cited
UNITED STATES PATENTS
| | | | |
|---|---|---|---|
| 2,962,143 | 11/1960 | Heinemann | 192/84 PM |
| 3,203,523 | 8/1965 | Gilder et al. | 192/56 R |
| 3,240,304 | 3/1966 | Wickersham | 192/84 PM X |

Primary Examiner—Benjamin W. Wyche
Assistant Examiner—Frank H. McKenzie, Jr.

[57] ABSTRACT

This invention permits the counter-balancing of the longitudinal movement due to the transmitted torque of the sliding member with respect to the other member in a torque-limiting clutch of the indexed-release type comprising two oppositely-facing members coupled for rotation, one to the driving shaft and the other to the driven shaft. According to the invention, permanent magnets carry out the function of counter-balancing and are advantageously housed in an enclosed space. The invention is especially applicable to the protection of a machine driven by a driving device when this machine becomes mechanically blocked.

7 Claims, 4 Drawing Figures

TORQUE-LIMITING CLUTCH

The present invention has for its object a torque-limiting clutch, and especially a torque-limiting clutch indexed for release.

Torque-limiting clutches are devices intended to protect a receiving machine driven by an engine, when this machine becomes mechanically blocked. They are mounted on the shaft which couples the engine to the driven machine and limit the torque transmitted to a pre-set value comprised between the normal working torque of the driven machine and the torque at which the driven machine or the coupling shaft or the driving machine would sustain damage.

They are divided into two large classes:
— Torque-limiters which continue to transmit the pre-set torque in case of overload, even for the whole duration of the overload. This is the case of friction torque-limiters with electric coupling (eddy currents) or hydraulic.
— Torque-limiters with release, which produce an automatic de-clutching effect as soon as the torque to be transmitted exceeds the pre-set value, and which completely separate the driven machine from the driving machine.

Torque-limiters of this kind require re-setting after operation in order to re-establish the clutch engagement.

It will further be noted that, generally, torque-limiters of the first type are liable to slip slightly at average torques lower than the pre-set torque, whereas those of the second type do not slip at all.

A further difference is that torque-limiters of the first type generally couple the shafts together without any identified position, that is to say at any relative angular position whatever, whereas the second have generally only a limited number of relative angular positions of engagement. They are said to be "indexed." They may even be designed so that they can only be engaged once every revolution.

Indexed torque-limiters of the release type are constituted by two oppositely facing plates, one coupled in rotation to the driving shaft and the other to the driven shaft.

These two plates are provided on their opposite faces with complementary forms which engage with each other (balls on one plate, conical recesses on the other, or conical bevel wheels with a flat top) so that any relative angular movement of these two plates causes a relative longitudinal movement of one plate with respect to the other.

One of the two plates is generally mounted slidably on its shaft and is urged by a spring towards the other plate.

The regulation of the torque to be transmitted is effected by modifying the length in position of the spring or springs. Various mechanical means enable the moving plate to be held in the released position in order to prevent any fresh contact between the forms which transmit the torque, after an overload.

The spring is sometimes constituted by conical spring washer (Belleville washer), the position of equilibrium of which (washer flat) is exceeded before complete disengagement of the clutch and which therefore passes abruptly, in the event of overload, from its normal conical position to the opposite conical position.

Other mechanisms comprise a toggle joint and spring so as to make one of the plates bi-stable: a stable position with the clutch engaged and another when disengaged, with an abrupt passage from one to the other.

Electro-magnetic clutches with toothed faces are also known, in which a magnetic field created by an electric current holds the two plates in contact, while a weak spring tends to separate them. During an overload, the two plates in contact move away from each other, the lines of force become extended, producing a variation in the reluctance, and therefore a variation of the current in the excitation coil. This current variation, detected by an appropriate electric circuit, interrupts the excitation of the coil and the clutch coupling is released.

There may finally also be cited torque-limiters using magnetic powder which fixed together the driving and driven shafts under the effect of a magnetic field, created either by a coil or by a coil or by a permanent magnet.

In accordance with the invention, permanent magnets are provided to counterbalance the longitudinal movement of the sliding element as long as their force of the attraction applied on the sliding element is greater, the field of these magnets being closed both in the engaged and in the disengaged position of the clutch, a control being also provided to permit the longitudinal movement of the sliding element, either for a voluntary release or for re-setting after a voluntary release, or a release due to torque overload.

The magnets are advantageously housed in a closed space.

According to one form of embodiment of the invention, the sliding element is in the form of a casing and surrounds a plate, rigidly fixed on the driving shaft and carrying the permanent magnets, the field of these magnets being closed in the engaged and disengaged positions of the clutch either by one or the other of the internal faces of the casing.

The magnets are provided alternately with their North and South poles on the two faces of the plate on which they are carried.

Small separate plates carried by one of the internal faces of the casing and equal in number to that of the magnets, close the field of these magnets in the engaged position of the clutch.

The angular position of the small plates with respect to the magnets can be regulated.

Flexible blades are provided for coupling together the driving shaft and the sliding element for rotation.

The above-specified arrangements give, in particular, the following advantages:
— The system is autonomous and does not require any electric supply;
— the magnetic faces which are to co-operate being housed in a closed space, any stray air-gap caused by the accumulation of iron filings or common bodies is thus avoided;
— the very rapid decay of the force as a function of the air-gap makes it ossible to obtain very abrupt and very rapid release of the clutch;
— the rotational drive of the moving part, while permitting a longitudinal movement, is ensured without friction by the flexible blades.

Other characteristic features and advantages of the present invention will be brought out in the description which follows below, reference being made to the accompanying drawings, in which.

Figure 1:
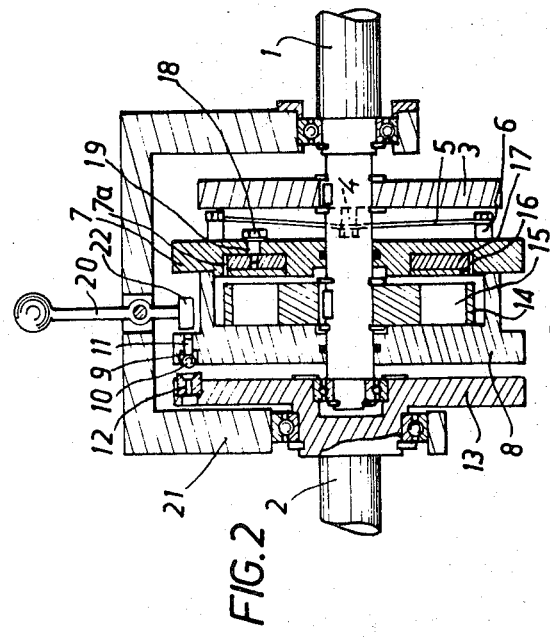
FIGS. 1 and 2 are views in cross-section in two different positions of operation, of a torque-limiting clutch indexed for release in accordance with the invention.

The invention is directed to the coupling of a driving shaft 1 to a driven shaft 2, while ensuring rotation without slip and in one single angular position only. It permits the manual engagement and release of the driven shaft at will, together with an automatic release action in the event of excessive torque.

The shaft 1 carries a keyed plate 3 which acts through the intermediary of driving fingers 4 which are coupled to it to drive through the metal spring blades 5, fingers 6 rigidly fixed to two parts 7 and 8 assembled together. The assembly 7–8 forming a casing is therefore capable of longitudinal movment by a virtue of the bending of the blades 5. On the other hand, the casing 7–8 is rigidly coupled for rotation to the shaft 1.

The member 8 is provided on its outer face with drilled depressions 9 containing balls 10 which are pushed by regulating screws II into conical recesses 12 carried by a plate 13 rigidly fixed on the driven shaft 2.

A plate 14 of non-magnetic material, rigidly fixed to the driving shaft 1, carries magnets 15 which attract soft iron plates 16 carried by a non-magnetic armature 17 in a groove 7a formed in the internal face of the member 7. The armature 17 can be rotated manually for its adjustment with respect of the member 7 by means of screws 18 passing through elongated slots 19 formed in the member 7.

Figure 3:
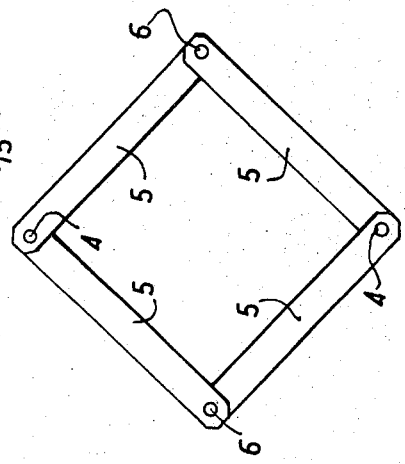
FIG. 3 is a detail view showing in particular two of the magnets carried by the plate enclosed in the moving casing.

The magnets 15 are arranged as shown in FIG. 3, in such manner as to present alternately North and South poles on the two faces of the plate 14.

The small iron plates 16, equal in number to that of the magnets, are separated by radial grooves which form an air-gap. The arrangement of the magnets 15 is such as to enable the casing 7–8 to be held either towards the left-hand side looking on FIG. 1. (clutch engaged position) or towards the right-hand side looking on FIG. 2 (disengaged position).

Figure 2:
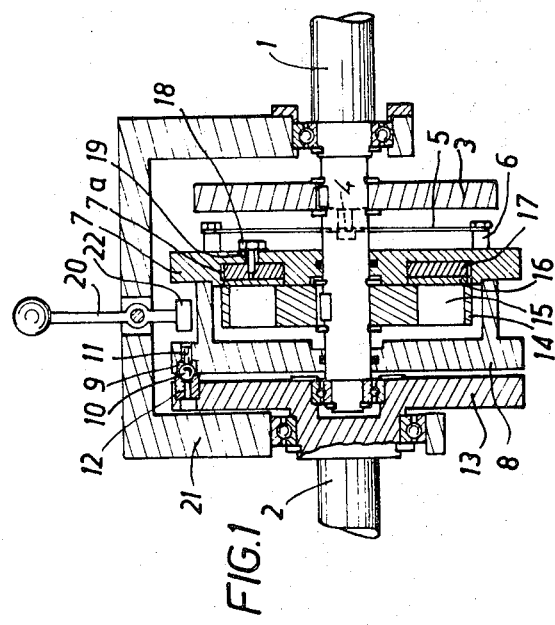
Figure 4:
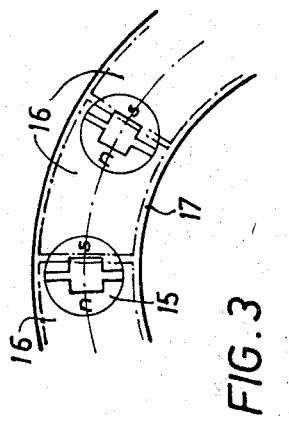
FIG. 4 is a front view of the spring coupling blades.

In the engaged position of FIG. 1, the force of attraction of the magnets can be regulated by varying the angular position of the small plates 16 with respect to the magnets 15, by means of the screws 18. This operation has the object of varying the reluctance of the magnetic circuit of the magnets and in consequence their force of attraction.

The operation of the torque-limiting device indexed for release according to the invention is as follows:

The torque to be transmitted between the shafts 1 and 2 is produced, due to the contact of the balls 10 in the conical recesses 12, by a force directed along the aixs of rotation of the shafts and from the shaft 2 towards the shaft 1.

This force is counterbalanced by the force of attraction of the magnets 15 on the armature 16, transmitted to the casing 7–8 by the screws 18.

As long as the longitudinal force due to the torque transmitted is less than the force of the magnets, the balls remain in the conical recesses and transmit the torque.

On the other hand, when the longitudinal force due to the torque transmitted exceeds the force of attraction of the magnets, the armature 16 loses contact with the magnets, thus giving the casing 7–8 the possibility of moving towards the right (looking on FIG. 2) which causes the balls 10 to come out of the conical recesses 12 and releases the shafts. When the travel of the casing 7–8 is completed, the magnets 15 attract the member 8 by their left-hand faces and thus hold it in the released position shown in FIG. 2.

An operating lever 20, articulated on the frame 21 and terminating in a roller 22 enables the casing 7–8 to be moved lontitudinally either into the engaged or the released position.

After a release, voluntary or due to torque overload, it is necessary to re-set the device while keeping the balls in contact with the face of the member 13 by means of the lever 20, the shaft 1 being driven at low pseed until the balls 10 come opposite the recesses 12 and effect the re-engagement of the clutch, It will of course be understood that the present invention has been described and illustrated only by way of a preferred example, and that equivalents may be introduced into its constituent parts without thereby departing from the scope of the said invention, as defined in the appended claims.

Thus, it will still be within the scope of the invention to reverse the functions of the driving and driven shafts 1 and 2. In addition, the flexible blades 5 may be replaced by any other device: sliding key, fluted shaft, etc.

I claim:

1. A torque-limiting clutch of the indexed release type comprising a driving shaft and a driven shaft (the functions of the driving and driven shafts can be reversed), two members oppositely disposed and coupled for rotation one to said driving shaft and the other to said driven shaft, complimentary froms adapted to engage with each other and carried by said members on their opposite faces, one of said members being slidably mounted with respect to the other so that a relative angular movement of said facing members causes a relative longitudinal movment of one of said members, and means for effecting a function for counter-balancing said longitudinal movement, in which permanent magnets carry out said counterbalancing function as long as their force of attraction on said sliding element is the greater, a housing defining an enclosed space, said magnets being housed in said enclosed space, the field of said magnets being closed both in the engaged and disengaged positions of said clutch, and a control device permitting the longitudinal displacement of said sliding elements either to effect a voluntary release or re-setting after a voluntary release or a release due to a torque overload.

2. A torque-limiting clutch of the index-release type comprising a driving shaft and a driven shaft (the functions of the driving and driven shafts can be reversed), two members oppositely disposed and coupled for rotation one to said driving shaft and the other to said driven shaft, complimentary forms adapted to engage with each other and carried by said members on their opposite faces, one said member being slidably mounted with respect to the other so that a relatively angular movement of said facing members causes a relative longitudinal movement of one of said members, and means for effecting a function for counterbalancing such longitudinal movement, in which permanent magnets carry out said counter-balancing function as long as their force of attracting on said sliding element is the greater, a plate rigidly fixed on one of said shafts and carrying said permanent magnets, said sliding member being in the form of a casing adapted to surround said plate, the field of said magnets being closed both in the engaged and disengaged positions of said clutch, either by one or the other of the two internal faces of said casings, and a control device permitting the longitudinal displacement of said sliding elements either to effect a voluntary release or re-setting after a voluntary release or a release due to a torque overload.

3. A clutch as claimed in claim 2, further characterized in that said magnets presents alternately North and South poles on the two faces of said plate.

4. A clutch as claimed in claim 2 further characterized by the fact that the field of said permanent magnets is closed in the engaged position of said clutch by small separate plates carried on one of the internal faces of said casing, and equal in number to said magnets.

5. A clutch as claimed in claim 4, further comprising a groove formed in said internal face of said casing and a nonmagnetic armature carrying said small plates, arranged in said groove and adapted to rotate in said groove, thereby enabling the angular positions of said small plates to be regulated with respect to said magnets and permitting the reluctance of the magnetic circuit and therefore the force of attraction of said magnets to be varied.

6. A clutch as claimed in claim 2, in which said complementary forms adapted to engage one in the other are constituted by balls and conical recesses.

7. A torque-limiting clutch of the indexed release type comprising a driving shaft and a driven shaft (the functions of the driving and driven shafts can be reversed), two members oppositely disposed and coupled for rotation one to said driving shaft and the other to said driven shaft, complimentary forms adapted to engage with each other and carried by said members on their opposite faces, one of said members being slidably mounted with respect to the other so that a relevant angular movement of said facing members causes a relative longitudinal movement of one of said members causes a relative longitudinal movement of one of said members, a plurality of flexible spring blades adapted to couple one of said shafts for rotation with said sliding member, and means for effecting a function or counterbalancing said longitudinal movment, in which permanent magnets carry out said counter-balancing function as long as their force of attraction on said sliding element is the greater, the field of said magnets being closed both in the engaged and disengaged positions of said clutch, and a control device permitting the longitudinal displacement of said sliding elements either to effect a voluntary release or re-setting after a voluntary release or a release due to a torque overload.

* * * * *